(12) United States Patent
Foster et al.

(10) Patent No.: US 7,549,287 B2
(45) Date of Patent: Jun. 23, 2009

(54) HYDROSTATIC AUTO/MANUAL SPEED CONTROL

(75) Inventors: Christopher A. Foster, Akron, PA (US); Richard P. Strosser, Akron, PA (US); Justin Ringwald, New Holland, PA (US); Robert L. Fackler, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/901,105

(22) Filed: Sep. 14, 2007

(65) Prior Publication Data

US 2009/0071143 A1      Mar. 19, 2009

(51) Int. Cl.
*F16D 31/02* (2006.01)
(52) U.S. Cl. .............. 60/445; 60/448; 60/449
(58) Field of Classification Search .......... 60/448, 60/445, 447, 487, 489, 431, 464, 449, 490, 60/433, 450, 488; 417/286, 64, 212, 305, 417/469, 222.1, 53; 56/11.9
See application file for complete search history.

(56) References Cited

U.S. PATENT DOCUMENTS

| | | | | |
|---|---|---|---|---|
| 3,783,611 | A | | 1/1974 | Bohas ........................ 60/19 |
| 3,785,754 | A | | 1/1974 | Miller ...................... 417/213 |
| 3,841,795 | A | | 10/1974 | Ferre et al. ............... 417/216 |
| 3,890,782 | A | | 6/1975 | Wauson ..................... 60/327 |
| 4,168,612 | A | * | 9/1979 | Nikolaus .................... 60/431 |
| 4,351,152 | A | * | 9/1982 | Reynolds et al. ............. 60/395 |
| 4,745,746 | A | * | 5/1988 | Geringer ..................... 60/447 |
| 4,920,748 | A | * | 5/1990 | Kordak et al. ................ 60/414 |
| 5,121,603 | A | * | 6/1992 | Widemann ................... 60/447 |
| 5,203,168 | A | * | 4/1993 | Oshina et al. ................. 60/426 |
| 5,576,962 | A | | 11/1996 | Ferguson et al. .......... 364/431.3 |
| 5,684,694 | A | | 11/1997 | Ishino et al. ............ 364/424.08 |
| 5,791,128 | A | | 8/1998 | Rogalsky ..................... 56/14.5 |
| 5,823,072 | A | * | 10/1998 | Legner ....................... 74/733.1 |
| 6,033,188 | A | * | 3/2000 | Baldus et al. ............. 417/222.1 |
| 6,131,391 | A | * | 10/2000 | Poorman ...................... 60/448 |

(Continued)

FOREIGN PATENT DOCUMENTS

WO          9220921        11/1992

*Primary Examiner*—Árpád Fábián-Kovács
(74) *Attorney, Agent, or Firm*—Patrick M. Sheldrake; John William Stader; Michael G. Harms

(57) ABSTRACT

A hydrostatic system and method of operation thereof, wherein at least one of a fluid motor and a pump of the system has a displacement which is variable for controlling a speed of operation of the motor, the pump being driven by an engine, and a controller configured for monitoring the speed of operation of the motor and an operating characteristic of the engine and automatically controlling the displacement responsive thereto, wherein if the operating characteristic is indicative of engine performance above a predetermined threshold, the controller will control the displacement for maintaining the speed of operation of the motor at about a predetermined value, and, if the operating characteristic is indicative of engine performance below the threshold, the controller will hold the displacement at a constant value. As a result, the controller can prevent the system from further decreasing the engine performance. And, if the engine performance increases to that or another threshold, the controller will automatically switch back to controlling the displacement for holding the motor speed at the predetermined value, optionally including to incrementally increase the speed to the predetermined value.

14 Claims, 4 Drawing Sheets

U.S. PATENT DOCUMENTS

| | | | |
|---|---|---|---|
| 6,375,433 B1 * | 4/2002 | Du et al. | 417/53 |
| 6,675,577 B2 | 1/2004 | Evans | 60/445 |
| 7,130,721 B2 * | 10/2006 | Wear et al. | 700/282 |
| 2001/0035014 A1 * | 11/2001 | Yano et al. | 60/490 |
| 2002/0176784 A1 * | 11/2002 | Du | 417/53 |
| 2004/0079077 A1 * | 4/2004 | Yano et al. | 60/487 |
| 2004/0261407 A1 | 12/2004 | Du | 60/448 |
| 2005/0129533 A1 * | 6/2005 | Yano et al. | 417/286 |
| 2005/0279070 A1 * | 12/2005 | Pirro et al. | 56/14.6 |
| 2007/0130931 A1 * | 6/2007 | Burgart et al. | 60/445 |

\* cited by examiner

HYDROSTATIC AUTO/MANUAL SPEED CONTROL

TECHNICAL FIELD

The present invention relates to a speed control for a hydrostatic system, and, more particularly, to a speed control which normally operates in an automatic mode wherein it will maintain an output of the hydrostatic system at a constant speed while being subjected to varying power supply and loads, and which, responsive to a low power availability condition, will automatically change to a manual or limited power demand mode, and then, responsive to a return to normal power availability, will automatically change back to the automatic mode, including to a previous speed setting.

BACKGROUND OF THE INVENTION

Hydrostatic systems are commonly utilized for powering a wide variety of apparatus, including on work machines such as tractors used for agricultural, construction, and other applications. A particularly pertinent application for the present invention is crop cutting apparatus of agricultural harvesting machines, most particularly, disk cutting apparatus of windrowing machines. A disk cutter includes rotatably driven disks having knives extending radially outwardly from the outer circumferential edges thereof, arrayed across the width of a header propelled by a tractor. The header can be supported on the front of the tractor, or towed. The disk cutters are driven by a fluid motor of a hydrostatic system, and, for a wider header with a large number of cutters, two or more hydrostatic systems may be used. The fluid pump of the hydrostatic system will typically be located on the tractor and driven by the tractor engine, and will provide the driving fluid to the motor, through fluid lines that extend between the pump and motor, forming a fluid loop.

A typical cutting speed for a disk cutter is about 2200 to 3200 rpm. It is typically desirable for the cutters to operate at a constant or set speed, under a variety of changing conditions, which can include, but are not limited to, varying crop population and moisture content, cutting viny, thick stalked or shrubby weed infestations, occasional contact of one or more cutters with the ground, and/or varying available engine power. Closed loop speed control is typically employed for maintaining a constant cutting speed, and the pump or the motor will have a displacement that can be varied for achieving generally constant motor and cutter speed under the changing power availability and load conditions. This variable displacement will typically be controllable by a solenoid. Varying electrical current signals are utilized for operating the solenoid, for operating the cutters at the desired speed and in the desired direction.

In a typical speed control arrangement, the electrical current signals can be controlled by an operator using a switch or dial located in the operator cab, or automatically controlled, using an automatic speed control, which can have a selectable speed. The automatic speed control will monitor a speed sensor, for instance, for sensing the speed of the motor or an element driven thereby, and will vary the electrical current signal as required for maintaining the selected speed. In operation, when a speed decrease is sensed the displacement of the variable displacement pump or motor will be varied, as required, to bring the speed back to the set value.

If a speed decrease is the result of just an increased load on the cutters, for instance, as a result of conditions such as ground contact, increased crop population or density, higher moisture content or other common conditions, a displacement variation to compensate to increase cutter speed is not problematic. However, a motor speed reduction can also occur as a result of a pump speed reduction, which, because the pump is typically driven by the engine, will also reflect an engine speed reduction or droop. An engine speed reduction or droop, can occur for a variety of reasons, including an intentional one, wherein the operator reduces engine speed for any of a variety of reasons, and also a load induced one, for instance from increased demand from one or more powered systems, such as the tractor drive system, and/or the cutters themselves. A load induced engine speed reduction can be problematic, as it can degrade overall machine performance, and, if severe enough, can result in engine stalling. If the engine stalls, the cutters will also stall, and, if this occurs during cutting, the cutters can clog with crop.

A related problem that can occur in a system utilizing a variable displacement pump, is that in an automatic operating mode, if the controller attempts to increase the cutter speed, this will likely entail increasing the displacement of the pump, which will also increase the load on the engine. This can result in further engine speed droop, poor engine performance, and possibly stalling, if the load is not reduced, such as by removal of the source of the excessive load, or if the operator does not intervene, such as by increasing throttle position, raising the header, and/or slowing ground speed.

Accordingly, what is sought is an automatic speed control for a hydrostatic system, which provides one or more of the operating advantages, and overcomes one or more of the problems, set forth above.

SUMMARY OF THE DISCLOSURE

What is disclosed is an automatic speed control for a hydrostatic system, which provides one or more of the operating advantages, and overcomes one or more of the problems, set forth above.

According to a preferred aspect of the invention, at least one of the fluid motor and pump of a hydrostatic system has a displacement which is variable for controlling a speed of operation of the motor, the pump being driven by an engine. A controller of the system is configured for monitoring the speed of operation of the motor and an operating characteristic of the engine, and for controlling the displacement. If the operating characteristic is indicative of engine performance above a predetermined threshold, the controller will operate in a first or speed control mode to control the displacement for maintaining the speed of operation of the motor at or about a predetermined selected or target value. However, if the operating characteristic is indicative of engine performance below the threshold, the controller will switch modes and operate to hold the displacement at a constant value, which is preferably the most recent value. Then, if the engine performance increases to above that or a different predetermined threshold, the controller will automatically switch back to the mode of controlling the displacement for holding the motor speed at the predetermined value, optionally including to gradually or incrementally increase the speed to the predetermined value, if the change is made with the motor operating at a lower speed.

According to a preferred aspect of the invention, the pump has the variable displacement, and the monitored operating characteristic of the engine is, or is representative of, the engine speed. Also, the performance characteristic is preferably engine speed, and the threshold is a low speed value, for instance, one which is at least marginally greater than a stall speed of the engine. As a result, and as an advantage, at times when the engine is under heavy load and losing speed, the controller can prevent the hydrostatic system from increasing the load on the engine and contributing to further engine speed decrease, performance degradation, and even stalling.

As another advantage, because the controller will automatically return to the speed control operating mode once the engine operating characteristic, e.g., engine speed, is at or above a threshold level, no operator action is required, although an intervening operator action may be required for increasing the engine speed, for instance, by increasing the engine throttle position, or decreasing load on the engine such as, for a harvesting machine application, raising the header or decreasing ground speed. The engine load may also decrease as a matter of course, such as if the extra load is removed.

As still another advantage, the controller may be able to react to high engine load conditions, and return to normal automatic operation, more rapidly than an operator could, which would have particular utility when a sequence of short duration engine droop conditions are encountered.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
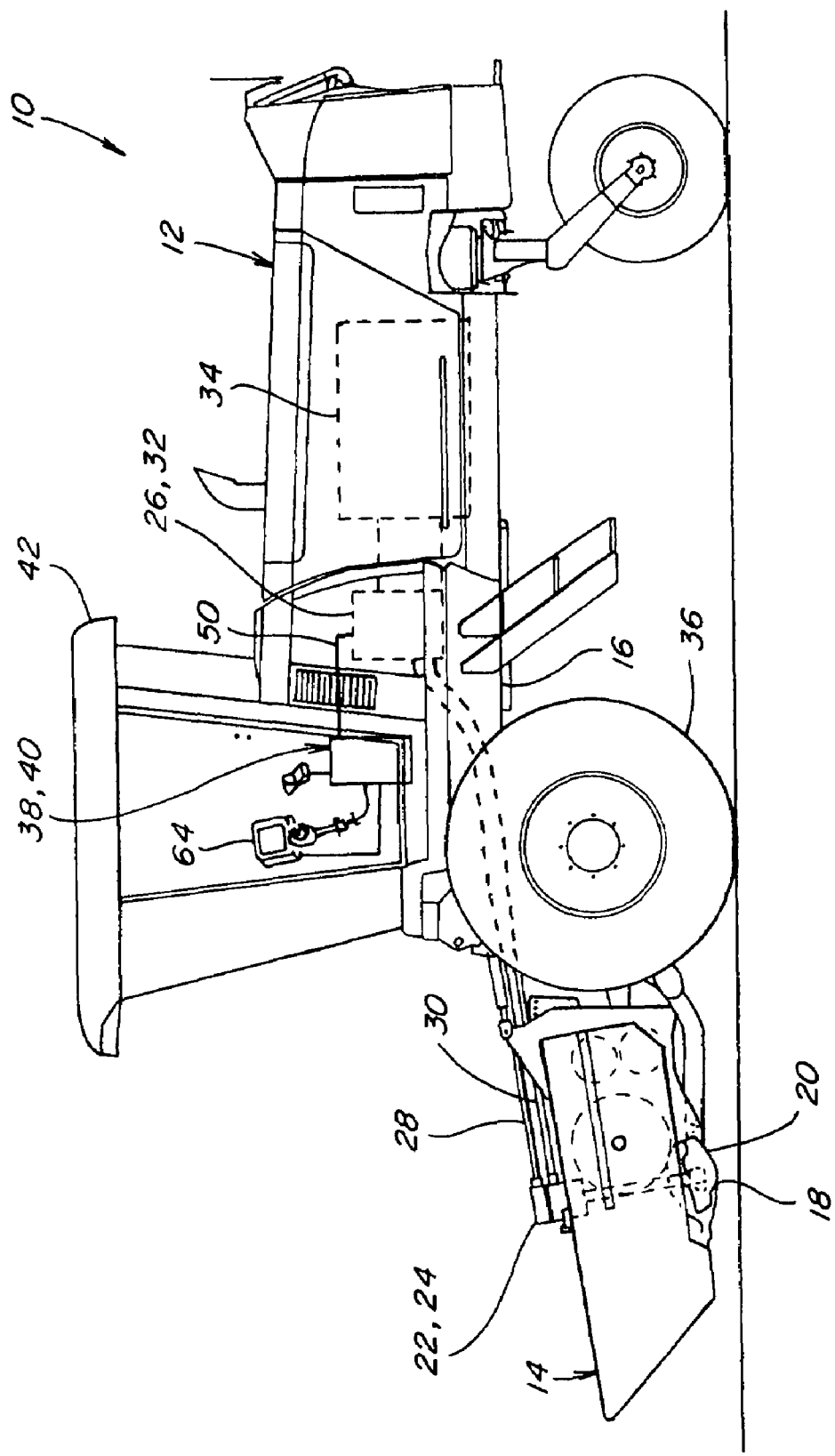
FIG. 1 is a side elevational view of a crop harvesting machine of a type with which the invention may be used, showing a header including disk cutters powered by a hydrostatic system, in connection with a speed control of the present invention.
Figure 2:
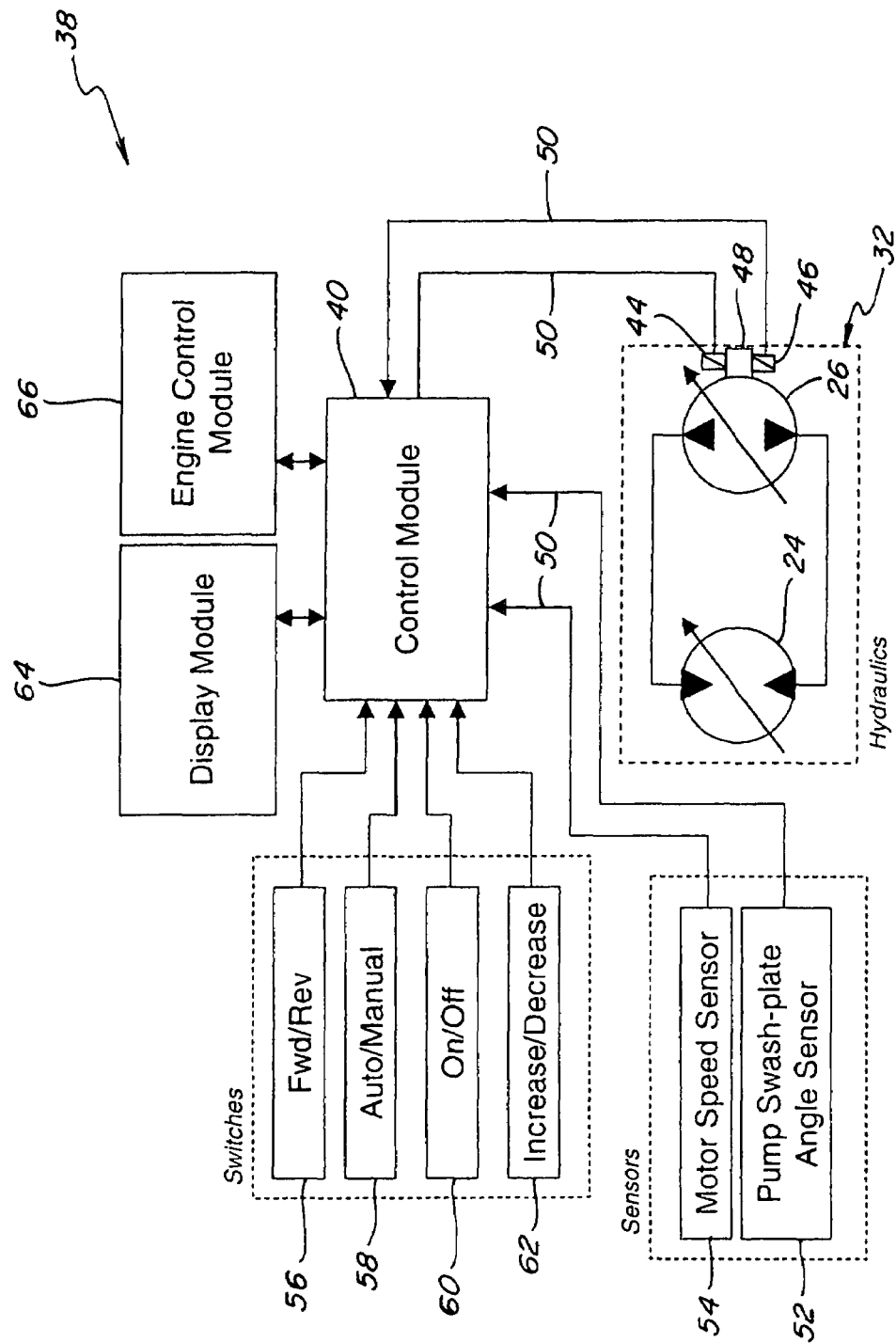
FIG. 2 is a simplified schematic diagram of elements of the hydrostatic system and the speed control of the invention.
Figure 3:
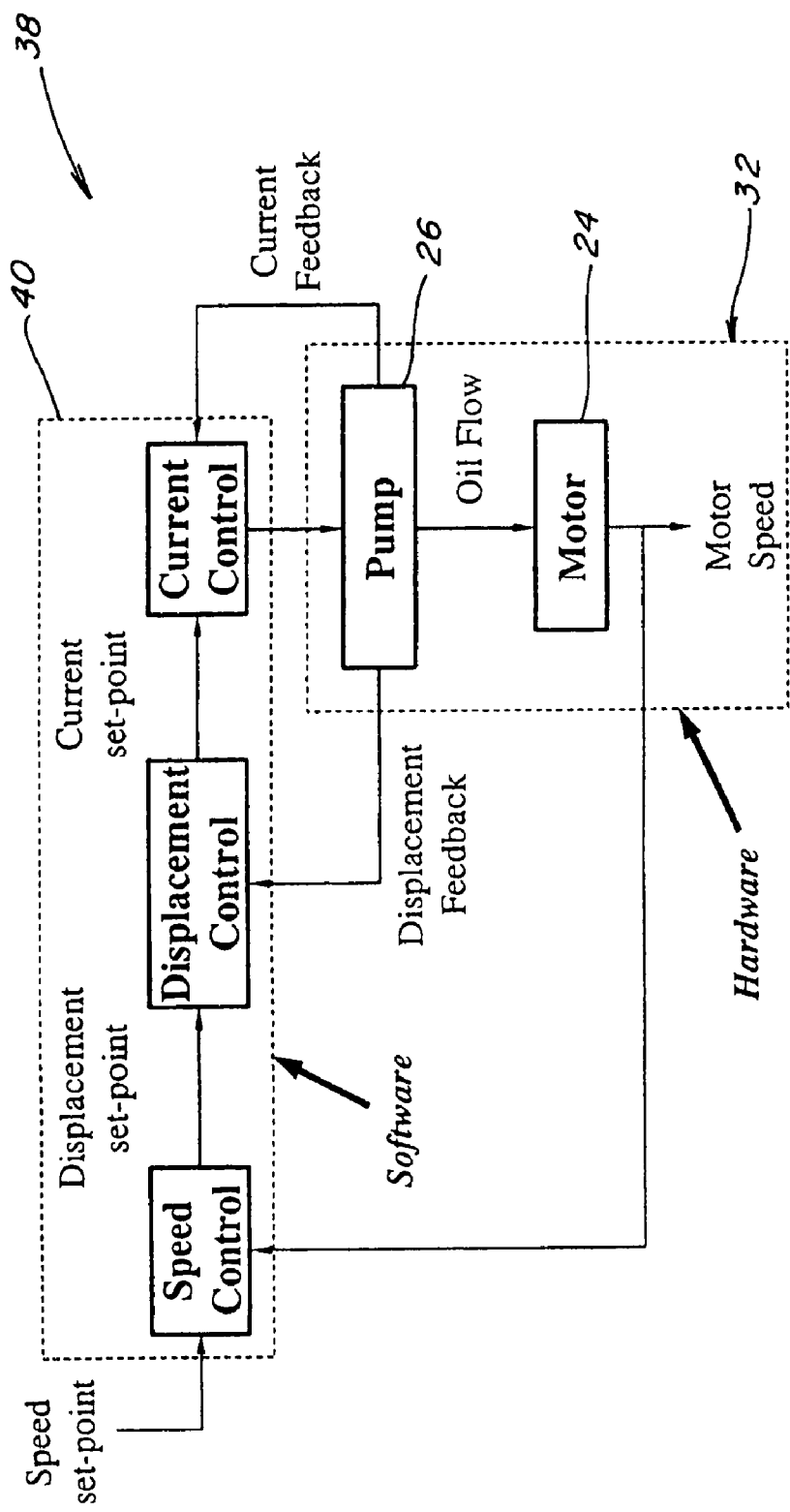
FIG. 3 is another schematic showing aspects of the control.

FIGS. 1, 2 and 3, show the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14 (FIG. 1), the header 14 being attached to the front end of a frame 16 or chassis of the tractor 12. The header may be of generally any suitable construction and design, and will include crop-harvesting mechanisms, such as a plurality of disk cutters 18 (FIG. 1).

Disk cutters 18 of header 14 comprises a plurality of disks 20 arranged in a side-by-side array across header 14, each of the disks carrying knives at spaced locations around an outer circumferential periphery thereof, as is well-known in the art. Disks 20 are rotated by a drive 22 in the well known manner, drive 22 preferably including one or more fluid motors 24 operable for driving one or more of disks 20, each fluid motor 24 comprising an element of a hydrostatic system 32, and being connected in fluid communication with a pump 26 on tractor 12, by fluid lines 28 and 30, also of system 32, for receiving pressurized fluid therefrom, and returning the fluid to pump 26, in a fluid loop, also in the well-known manner. In the system shown, pump 26 preferably has a variable displacement, which displacement is determined by the angle of an internal swash plate, again, in the well-known manner, and the angle being controllable, as will be explained, for controlling a speed of operation of disk cutters 18 according to the invention.

Header 14 is mounted on a pair of lower arms which extend forwardly from frame 16 of tractor 12, and which are movable upwardly and downwardly for positioning the header at a desired cutting height, or at an elevated transport position, using one or more lift cylinders (not shown), also in the well-known manner. The upper end of the header is connected to frame 16 by an upper or center link connected to a mechanism operable for tilting the header to a desired orientation, again, in the well-known manner. Here, it should also be noted that header 14 is interchangeable with a variety of alternative headers, such as a header including a sickle type cutter, as is also well-known. As another alternative, a header, such as header 14, or a sickle type header, may be towed by tractor 12, the invention, as will be explained, having utility for any of the aforementioned header and cutter types, and also for hydrostatic systems utilizing a variable displacement motor, with some adaptation.

A typical speed of rotation of disks 20 of disk cutters 18 is within a range of from about 2200 rpm to about 3200 rpm. A typical operating speed for a sickle cutter of a header will be within a range of from about 1500 cycles per minute to about 1800 strokes per minute. Typically, it is desirable to operate the cutters at a generally constant speed within the range of operation thereof, to provide adequate cutting capability, and avoid clogging of the cutters.

Pump 26 of hydrostatic system 32 is driven by an engine 34 of tractor 12. Engine 34 also powers other aspects of windrower 10, including a propulsion driveline including fluid motors in connection, respectively, with drive wheels 36, which are differentially operated for effecting steering movements. The differential operation of the fluid motors of the driveline, and the travel speed, are effected by varying the displacement of fluid pumps in connection with the respective fluid motors of the driveline. A typical range of operating speeds of engine 34 of windrower 10 will be from about 1300 rpm, which represents a low idle speed, to about 2200 or 2300 rpm, which represents a typical normal operating speed.

As a result, engine 34 will typically be subjected to varying power demands from several sources, which, at times, can tax or strain engine 34, and cause the operating speed thereof to be reduced or droop so as to negatively affect performance and operator satisfaction. If the load is severe enough, the engine can even stall, which is very undesirable.

A speed control 38 constructed and operable according to the teachings of the present invention, is shown in connection with hydrostatic system 32, and is automatically operable for avoiding the above problems. Speed control 38 includes a control module 40, which is preferably a conventionally constructed and operable microprocessor based controller, suitably located on tractor 12, such as in an operator cab 42. Control module 40 is programmed to operate according to steps of the invention, as will be explained, for automatically controlling a speed or velocity of operation of fluid motor 24 of hydrostatic system 32, for maintaining disk cutters 18 operating at or about a set speed, under normal conditions, and, additionally, for automatically limiting the load applied thereby on engine 34, when a predetermined condition or conditions is/are present, particularly, when engine 34 is under strain, such as will cause degradation of performance, including possible stalling.

The displacement of pump 26 of hydraulic system 32 is preferably solenoid controlled, most preferably by a forward proportional solenoid 44, operable for controlling fluid flow through system 32 so as to travel in a direction for rotating cutters 18 in a direction denoted as a forward direction, and by a reverse proportional solenoid 46 operable for rotating cutters 18 in a reverse direction. Solenoids 44 and 46 control a control valve 48 of pump 26 in the well-known manner. Solenoids 44 and 46 are controlled by a variable electrical current signal, delivered thereto over suitable conductive paths 50, by control module 40, also in the well-known manner. Feedback of pump displacement is provided to control module 40, in a suitable manner, such as by a pump swash plate angle sensor 52, or by looking up stored map data correlating electrical current values with pump displacement. Control module 40 also receives a signal indicating the operating speed of motor 24, from a motor speed sensor 54. Both signals will be transmitted over a suitable conductive path 50.

Control module 40 is connected to several input devices, including a forward/reverse switch, 56, operable for selecting a direction of operation of pump 26 and thus cutters 18; an auto/manual switch 58, operable for selecting a mode of operation; an on/off switch 60, operable for turning the speed control on and off; and an increase/decrease switch 62, operable for increasing or decreasing a cutter speed set point. Control module 40 is also connected to a display module 64, for displaying system information, such as direction of cutter rotation, speed, operating mode, and also warnings; and to an engine control module 66, for receiving information relating to selected operating parameters and characteristics of the engine, particularly engine speed, and also for optionally sharing information with the engine control module.

Figure 4:
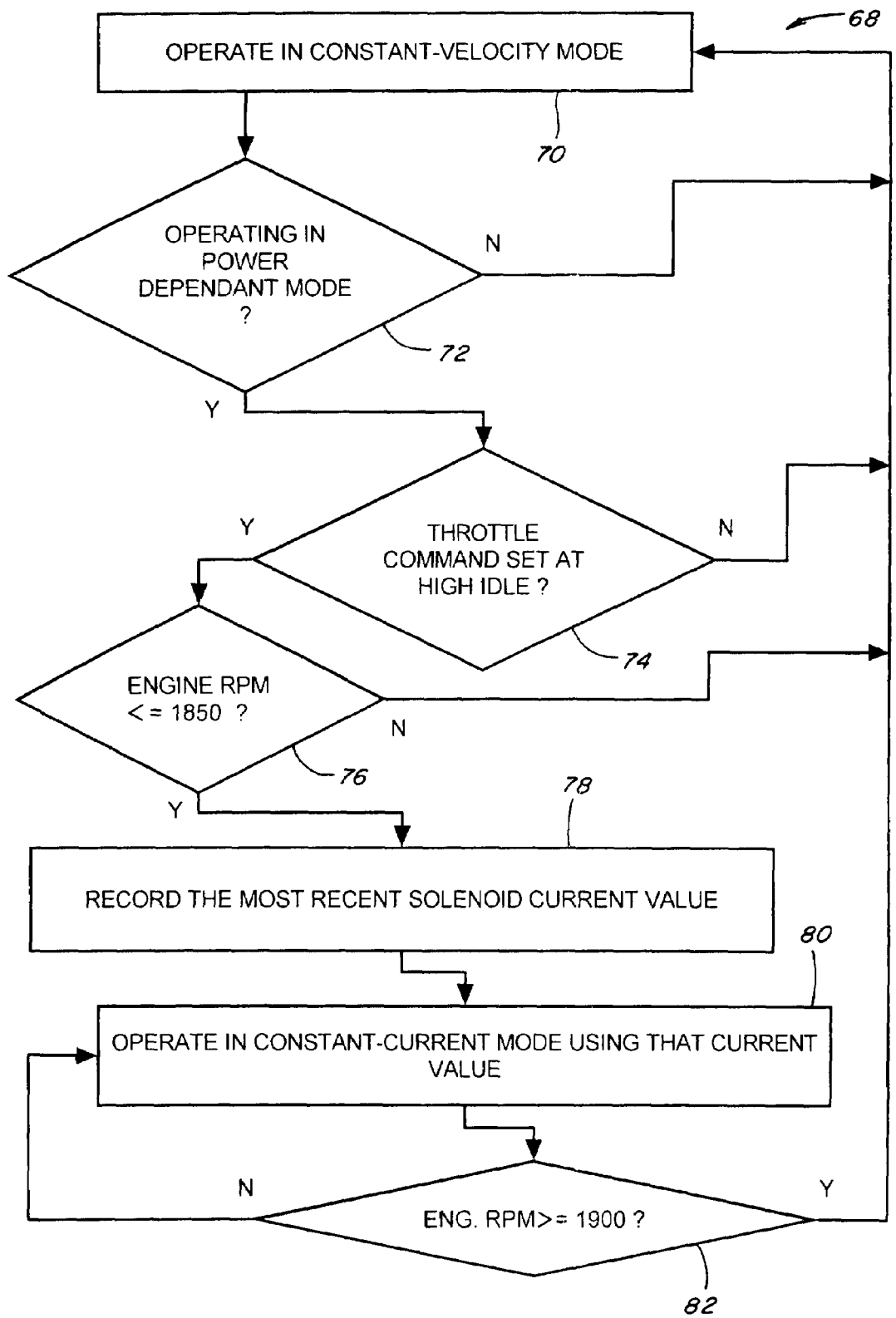
FIG. 4 is a high level flow diagram of steps of a preferred embodiment of a method of operation of a speed control of the invention.

Referring also to flow diagram 68 of FIG. 4, wherein steps of an operating method of the invention are shown, with speed control 38 set to an automatic speed or velocity control mode, as denoted at block 70, control module 40 is configured and programmed so as to monitor and maintain a set motor speed. The motor speed will be power dependent, and thus a function of the swash plate angle, pump speed (and thus engine speed), and also other factors such as cutter load, and thus electrical current signal value outputted by control module 40 to the appropriate solenoid will likely be varied relatively frequently to maintain the motor speed at the target value. Control module 40 will thus determine if it is operating in this mode, as denoted at decision block 72. If yes, it will determine if the throttle is set at a predetermined position, preferably, high idle, as denoted at decision block 74. Control module 40 will then determine if the actual engine speed is less than a predetermined threshold value, here 1850 rpm, which may be, for instance, a value at least marginally greater than that at which performance degradation may occur, as denoted in decision block 76. Control module 40 will also record the most recent solenoid current value, as denoted at block 78. Control module 41 will then commence operation in a constant-current mode. That is, the value of the electrical current signal outputted to the appropriate solenoid will be maintained at a constant value, irrespective of motor speed, as denoted by block 80. In this mode, control module 40 will continue to monitor engine speed, and if it is greater than a predetermined threshold value, which can be the same or different than that just discussed, here 1900 rpm, as denoted at decision block 82, the control module will automatically switch or change to operation in the constant velocity mode, as shown in block 70. If engine speed is not greater than the threshold 1900 rpm, control module 40 will continue to operate in the constant current mode.

As an additional step, not shown, if when the change to constant speed mode is implemented, if the motor speed is significantly below the set or target value, the control module can be programmed to automatically gradually or incrementally increase motor speed, if desired.

Thus, as an advantage, if, during normal operation in the automatic constant motor speed mode, engine operation below a threshold speed is detected, speed control 38 will automatically change to the constant current mode, to prevent a possible increase in power demand on the engine from the pump when the engine is already under strain or near strain. Then, if the strain is reduced, and, as a result, engine speed increases, or throttle is increased by the operator, the system will revert back to the constant velocity mode.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A method of operation of a hydrostatic system, comprising steps of:
   providing a hydrostatic system including a fluid motor driven by a pump powered by an engine, at least one of the motor and the pump having a variable displacement for controlling a speed of operation of the motor, and a controller configured for monitoring the speed of operation of the motor and an operating characteristic of the engine, and automatically controlling the displacement responsive thereto, comprising steps of:
   continually monitoring the speed of operation of the motor and the operating characteristic of the engine, and:
   if the operating characteristic is indicative of engine performance above a predetermined first threshold, then controlling the displacement for maintaining the speed of operation of the motor at about a predetermined value, and:
   if the operating characteristic is indicative of engine performance below the first threshold, then automatically holding the displacement at a constant value equal to a stored most recent displacement value, and if the operating characteristic subsequently increases to be equal to or greater than a second threshold, then automatically controlling the displacement for maintaining the speed of operation of the motor at the predetermined value.

2. The method of claim 1, in which the operating characteristic comprises a speed of the engine.

3. The method of claim 2, in which the first threshold comprises a speed of the engine greater than a stall speed for the engine.

4. The method of claim 1, in which the motor drives cutters of an agricultural harvesting machine and the engine also drives the harvesting machine.

5. The method of claim 1, in which as part of the step of controlling the displacement to operate the motor at the predetermined value, the controller will automatically control the displacement so as to gradually increase the speed of the motor to the predetermined value.

6. The method of claim 1, in which the pump has the variable displacement.

7. A hydrostatic system, comprising:
   a fluid motor driven by a pump powered by an engine, the pump having a variable displacement which is controllable for controlling a speed of the motor; and a controller in control of the pump displacement and programmed to automatically operate in a first mode controlling the displacement for maintaining the speed of the motor at a set value when the engine is operating greater than a predetermined speed, to automatically change to a second mode holding the displacement at a fixed most recent value responsive to the engine speed falling below the predetermined speed, and to change back to the first mode responsive to the engine speed increasing to a predetermined value.

8. The system of claim 7, in which when switching back to the first mode, the controller will automatically control the displacement so as to gradually increase the speed of the motor to the stored value.

9. The system of claim 7, in which the motor drives cutters of an agricultural harvesting machine and the engine also drives the harvesting machine.

10. The system of claim 9, in which the cutter comprises a disk cutter, and the set speed comprises a speed within a range of from about 2200 rpm to about 3200 rpm.

11. A hydrostatic system for operating cutters of a harvesting machine, comprising:

a fluid motor driven by a pump powered by an engine of the harvesting machine, the pump having a variable displacement controlled by a solenoid controllable by application of variable electrical current signals thereto; and a controller connected to the solenoid and operable for outputting the variable electrical current signals thereto, the controller being programmed to automatically operate in a first mode for controlling the displacement for maintaining the speed of the motor at a set value when the engine is operating greater than a predetermined speed, to change to a second mode holding the displacement at a fixed recent value stored responsive to the engine speed falling below the predetermined speed, and to change from the second mode to the first mode responsive to the engine speed increasing to a predetermined speed.

12. The system of claim 11, in which the controller is connected to devices operable for outputting signals thereto representative of the speed of the engine, and the speed of the motor, respectively.

13. The system of claim 11, in which when changing from the second mode to the first mode, the controller will automatically control the displacement so as to gradually increase the speed of the motor to the set value.

14. The system of claim 13, in which the recent value is a most recent value.

* * * * *